UNITED STATES PATENT OFFICE.

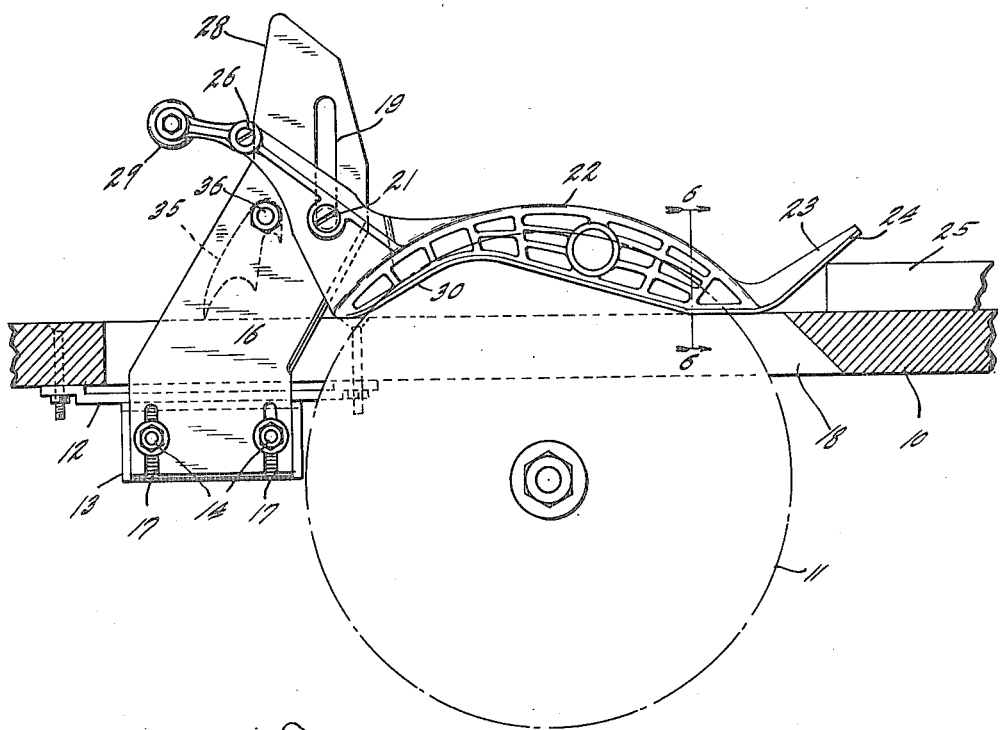
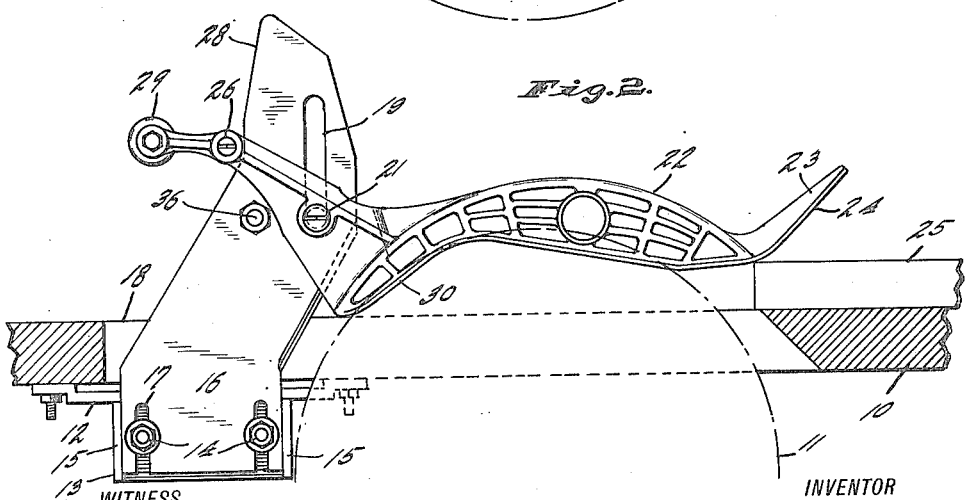

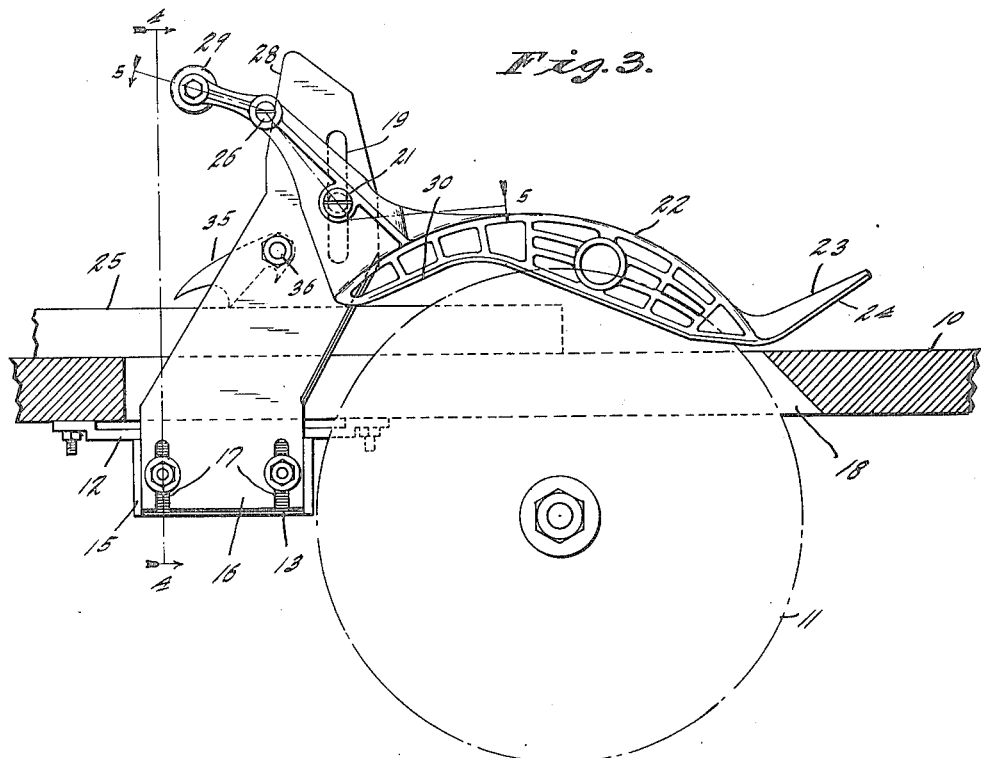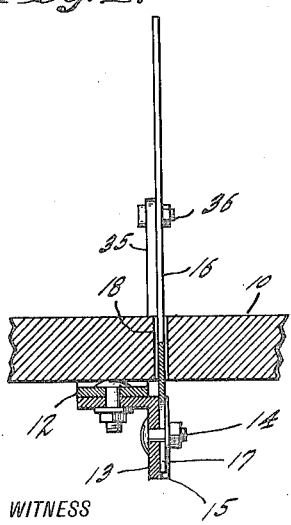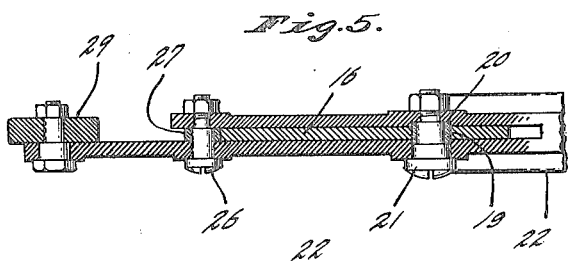

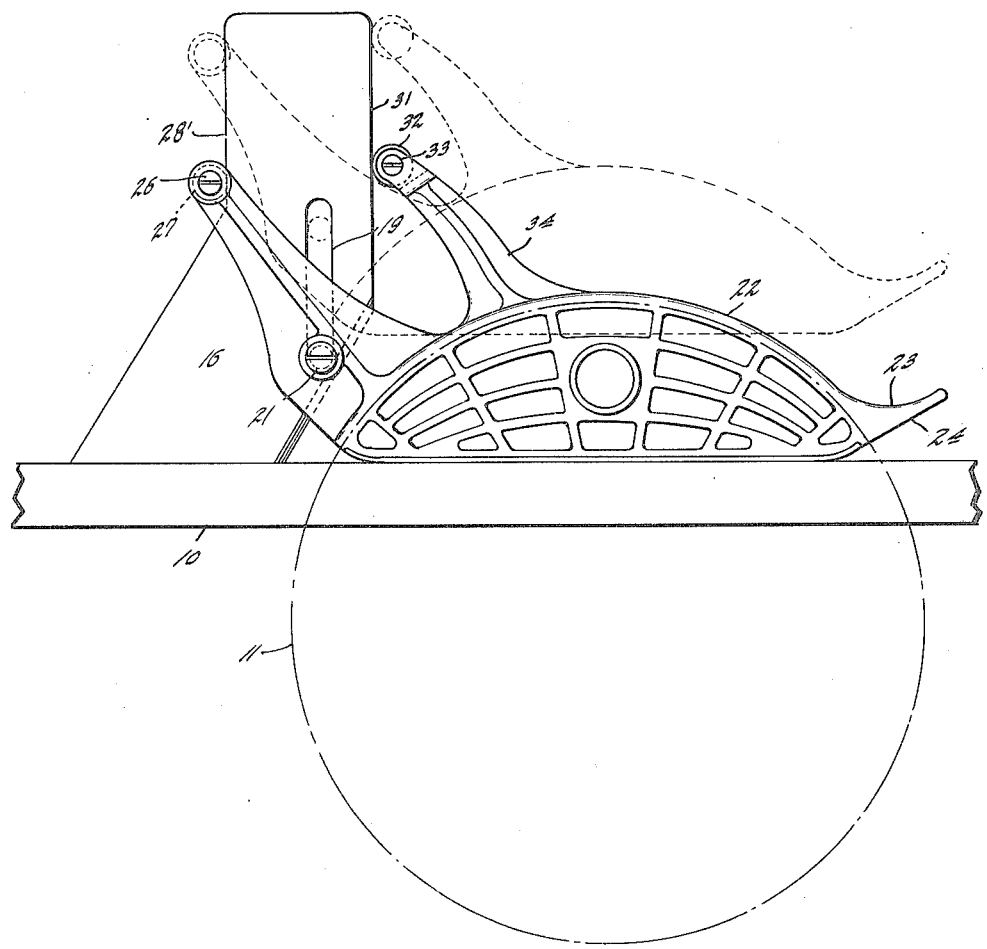

ROBERT C. COYLE, OF INDIANAPOLIS, INDIANA, ASSIGNOR TO E. C. ATKINS & CO., OF INDIANAPOLIS, INDIANA, A CORPORATION OF INDIANA.

SAW-GUARD.

1,207,683.  Specification of Letters Patent.  Patented Dec. 5, 1916.

Application filed November 24, 1915. Serial No. 63,147.

*To all whom it may concern:*

Be it known that I, ROBERT C. COYLE, a citizen of the United States, residing at Indianapolis, in the county of Marion and State of Indiana, have invented a new and useful Saw-Guard, of which the following is a specification.

It is the object of my invention to provide an effective guard for circular saws, which guard will preferably protect the exposed parts of the saw when the piece being sawed is approaching and leaving the saw as well as when it is in full engagement with the saw.

The accompanying drawings illustrate my invention.

Figure 1 is a vertical longitudinal section through a saw table in the plane of the saw, showing my saw guard attached thereto, with the saw guard lowered; Fig. 2 is a similar view, showing a board entering under the saw guard and the front end of the saw guard up-tilted; Fig. 3 is a similar view, showing the board passing out of engagement with the saw and the rear end of the saw guard up-tilted; Fig. 4 is a section on the line 4—4 of Fig. 3; Fig. 5 is a section on the line 5—5 of Fig. 3; Fig. 6 is a section on the line 6—6 of Fig. 1; and Fig. 7 is a view similar to Fig. 1, but showing a modification in which the saw guard moves parallelly.

The saw table 10 and circular saw 11 are of any ordinary construction. Bolted to the under side of the saw table is a metal strip 12, to which is bolted an angle bracket 13, through the vertical arm of which extends two bolts 14. The ends of the vertical arm of the angle plate 13 have out-turned flanges 15 between which slidingly fits the lower end of a vertical metal plate 16, such lower end being provided with slots 17 parallel to the flanges 15 and in position to receive the bolts 14, whereby the plate 16 may be adjusted vertically. The plate 16 projects upward through the slot 18 for the saw 11, behind such saw and in the same plane therewith, and is thinner than the cut which is made by the saw so that it can pass freely through the saw kerf. The plate 16 is preferably of the shape shown in Figs. 1, 2, and 3, so that its upper end projects forward and over the saw. The upper end of the plate 16 is provided with a vertical slot 19, in which slidingly fits a roller 20 carried by a bolt 21 passing through the bifurcated rear end of a saw guard 22. The main part of the saw guard 22 is of U-shaped cross section, as shown in Fig. 6, and is conveniently made in the form of a grating, for lightness, and the front end of the saw guard is provided with an up-turned oblique finger 23 having an oblique under surface 24 which is engaged by the board or other material to be sawed as such board approaches the saw 11. The lower edges of the guard 22 on each side of the saw may be straight, as shown in Fig. 7, or they may be low at the ends and high in the middle to form concave surfaces, as shown in Figs. 1, 2, and 3.

The bifurcated rear end of the saw guard projects upward and backward to the rear edge of the plate 16, and is there provided with a bolt 26 carrying a roller 27 which bears against such rear edge at a higher level than the roller 20. In the arrangement shown in Figs. 1, 2, and 3, the rear edge 28 of the plate 16 is inclined slightly forward near its upper end, so that it is at a slight angle to the slot 19, so that when the saw guard 22 is raised its forward end is capable of tilting down toward the table 10 with the back end still raised. By reason of having the roller 27 higher than the roller 20, the front end of the saw guard 22 may be raised without raising the rear end, and in addition the two rollers 20 and 27 may better carry the weight of the saw guard when necessary, as the portion of the saw guard in front of the roller 20 is considerably heavier than the part behind such roller.

If desired, one or both bifurcations at the rear end of the saw guard may be extended farther to the rear and may be provided with a counterweight 29, for producing a better balance. Thus with the arrangement shown in Figs. 1, 2, and 3, the board 25 when it is shoved toward the saw 11 strikes the oblique surface 24 as shown in Fig. 1 and up-tilts the forward end of the saw guard as shown in Fig. 2, the rear end of the saw guard remaining down close to the table 10. The surface 24 is thus a cam surface. As the board reaches the saw and is sawed thereby, and passes on it does not further change the position of the saw guard until the front edge of the board on each side of the saw approaches the rear of the saw. Then such front edge of the board strikes the inclined surfaces 30 of the concave lower edges of the two sides of the saw guard, and such edges 30 act as cams similarly to the surface 24, and in coöperation with the front edges of the board tilt upward the rear end of the saw guard from the position shown in Fig. 2 to about the position shown in Fig. 3; the front end of the saw guard still remaining raised, however, or in the position shown in Fig. 2. As the sawing of the board continues, and is completed, the rear edge of such board passes out from under the front end of the saw guard and allows such front end to tilt downward to the position shown in Fig. 3, the rear end still remaining elevated. This is not interfered with by the lower edges of the sides of the saw guard because of the fact that such lower edges are higher at the center than at the ends. This downward tilting is permitted by reason of the inclination of the surface 28. As the sawed board passes entirely out from under the saw guard, the rear end of such saw guard drops to the position shown in Fig. 1.

Instead of giving the saw guard a tilting movement, as in the arrangement shown in Figs. 1, 2, and 3, it may have a parallel movement, as shown in Fig. 7; in which case the rear edge 28' of the plate 16 is parallel to the slot 19, such slot and edge both preferably being vertical, and the front edge 31 of such plate 16 is parallel to the slot 19 and rear edge 28'. The rear edge 28' is engaged by the roller 27, as in the arrangement shown in Figs. 1, 2, and 3, and the front edge 31 is engaged by a roller 32 carried by a bolt 33 in an arm 34 extending upwardly and rearwardly from the upper end of the saw guard 22. The rollers 27 and 32 are both higher than the roller 20 which travels in the slot 19, so that a three-point support is furnished with the points all movable parallel to each other so as to maintain their relative position. This provides for a parallel movement of the saw guard 22. Since the saw guard 22 does not tilt in the arrangement shown in Fig. 7, the lower edges of such saw guard are horizontal.

A toothed dog 35 may be pivoted on the side of the plate 16, on a bolt 36, for acting as a ratchet in coöperation with the upper surface of the board 25 for preventing backward movement of such board.

I claim as my invention:

1. A saw guard for circular saws, comprising a plate arranged for support in the plane of the saw, said plate being provided with a slot, a saw guard U-shaped in cross section and having a rearwardly extending arm projecting past said plate, a pin carried by said rearwardly extending arm and coöperating with said slot for guiding the movements of said saw guard, a second pin carried by said rearwardly extending arm, said second pin coöperating with the rear edge of said plate, and said rear edge of said plate and said slot where they coöperate with said pins approaching each other obliquely upward.

2. A saw guard for circular saws, comprising a plate arranged for support in the plane of the saw, said plate being provided with a slot, a saw guard U-shaped in cross section and having a rearwardly extending arm projecting past said plate, a pin carried by said rearwardly extending arm and cooperating with said slot for guiding the movements of said saw guard, a second pin carried by said rearwardly extending arm, said second pin coöperating with the rear edge of said plate, said rear edge of said plate and said slot where they coöperate with said pins approaching each other obliquely upward, and the lower edges of said saw guard being lower at the ends than at the intermediate portion.

In witness whereof, I have hereunto set my hand at Indianapolis, Indiana, this twentieth day of November, A. D. one thousand nine hundred and fifteen.

ROBERT C. COYLE